Aug. 4, 1953

R. L. JAESCHKE 2,648,020

ELECTROMAGNETIC COUPLING

Filed Dec. 29, 1951

Aug. 4, 1953 R. L. JAESCHKE 2,648,020
ELECTROMAGNETIC COUPLING
Filed Dec. 29, 1951 3 Sheets-Sheet 2

Ralph L. Jaeschke,
Inventor.
Koenig and Pope,
Attorneys.

Aug. 4, 1953         R. L. JAESCHKE         2,648,020
ELECTROMAGNETIC COUPLING
Filed Dec. 29, 1951         3 Sheets-Sheet 3

Ralph L. Jaeschke
Inventor
Koenig and Pope,
Attorneys.

Patented Aug. 4, 1953

2,648,020

UNITED STATES PATENT OFFICE 2,648,020

ELECTROMAGNETIC COUPLING

Ralph L. Jaeschke, Kenosha, Wis., assignor to Dynamatic Corporation, a corporation of Delaware Application December 29, 1951, Serial No. 264,202

6 Claims. (Cl. 310—105)

This invention relates to electromagnetic couplings, and more particularly to machines of this type constituting clutch drives, brakes, dynamometers and the like.

Among the several objects of the invention may be noted the provision of a comparatively small and light machine for a given capacity and having a comparatively low flux leakage factor. The invention is carried out by an improved form and arrangement of magnetic poles and an inductor drum or sleeve arrangement such that for a unit having a single exciter coil as many traverses may be effected across the cylindric magnetic gap as formerly were accomplished by the use of two exciter coils. The poles are preferably (though not necessarily) made according to the disclosure in U. S. Patent 2,470,596, dated May 17, 1949 or, for example, as shown in U. S. Patent 2,525,571, dated October 10, 1950. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section showing a slip coupling incorporating one form of the invention;

Similar reference characters indicate corresponding parts throughout the several views of the drawings.

In the following description, an electric slip coupling will be described as embodying the invention, but it will be understood that the invention may also be used in connection with eddy-current brakes and dynamometers, which are in effect slip couplings in which one of the members is held stationary. It will also be understood that such apparatus sometimes employs a fluent magnetic material in the magnetic gap, and while such material is not specifically described herein, it is understood that it may be used.

Figure 1:
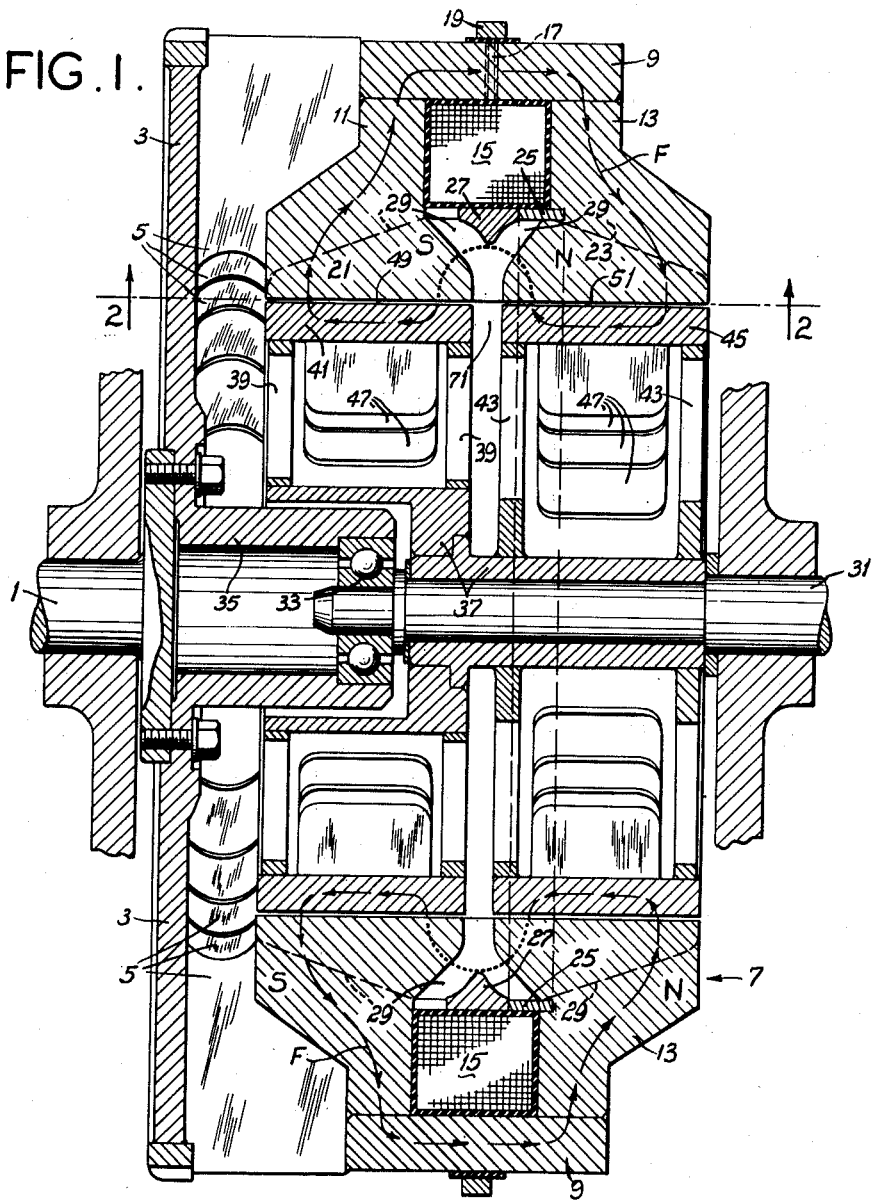

Referring now more particularly to Fig. 1, there is shown at numeral 1 a drive shaft for rotating a member 3 such as the flywheel of an internal combustion engine on an automotive vehicle. Attached to the flywheel 3 by means of air-circulating fins 5 is a magnetic field member 7, composed preferably of iron as the magnetic material. This member is constituted by an outside ring 9 to which are welded rings 11 and 13 forming a shell. Rings 11 and 13 flank an annular exciter coil 15 nested in shell 9, 11, 13. The coil is supplied with direct current through wires 17 and a slip ring 19. A single slip ring is sufficient if the circuit is grounded, but if not, then two slip rings may be employed.

The rings 11 and 13 are provided with poles 21 and 23, respectively, one group forming north poles N on one side of the coil, and the other group forming south poles S on the other side of the coil, as indicated. The poles are of the claw type overlapping the coil. Welded within the poles 13 is a nonmagnetic ring 25 for mechanically supporting and magnetically isolating a central magnetic ring 27. This ring 27 carries what will hereinafter be referred to as magnetic bridging poles 29, the opposite ends of which interdigitate with the poles 21 and 23, respectively. After assembly of the field member 7, the inner surfaces of the poles 21, 23 and 29 are circularly machined.

At 31 is shown a driven shaft which has a pilot bearing 33 within a hub 35 of the flywheel 3. The shaft carries a hub 37 upon which are spiders 39 for a first magnetic inductor drum or sleeve 41; and spiders 43 for supporting a second inductor drum or sleeve 45. The drums or sleeves 41 and 45 are exteriorly machined to provide magnetic gaps 49 and 51, respectively, of the order of .020 inch across. Numerals 47 indicate air-circulating blades.

Figure 5:
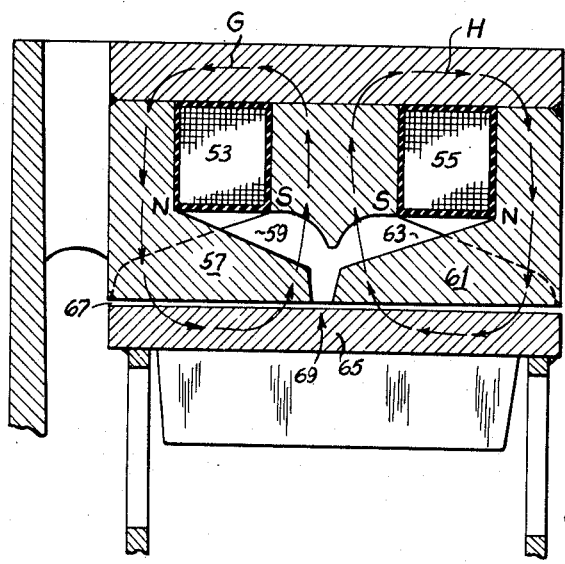
Fig. 5 is a diagrammatic view illustrating for comparison the principles used in former eddy-current machines and upon which the present invention is an improvement; and, Fig. 6 is a view similar to Fig. 2, showing an alternative pole arrangement.

When the coil 15 is excited by direct current, a toroidal flux field is brought into existence around it. In Fig. 1 the arrows F diagrammatically indicate a mean path in such a field. It emanates in concentrations from the north poles 13 and enters the inductor drum 45. It then leaves this inductor drum 45 and enters the bridging poles 29. It leaves these again to enter inductor drum 41 and leaves this inductor drum 41 to enter the south pole 21. After this it loops behind the coil 15 to complete the magnetic circuit. The result is that the flux field F at four different areas crosses a magnetic gap. Consequently, the tangential pull caused by the reactive fields of the eddy currents in the drums 41 and 45 with the polar fields in poles 21 and 23 is twice as much as if the magnetic circuit were allowed to proceed from poles 23, thence through a drum and finally returning to the coil 15 via the other pole 21. The latter was the former practice with machines of this class, and in order to increase their capacity they have been compounded as illustrated in Fig. 5. This compounding resulted in four crossings of flux through the magnetic gap, but as indicated in Fig. 5, it was done by means of two exciter coils 53 and 55, in which current was caused to flow in opposite directions, with the resulting toroidal magnetic fields G and H shown. Each coil 53 and 55 and the inner faces of the interdigitated north and south polar teeth such as illustrated at 57, 59, 61 and 63 were spaced from a common inductor drum 65 by a magnetic gap 67. Such a machine in effect constituted in a single machine two still older types of machines in which a single coil such as 53, for example, had a toroidal flux field G looping through an inductor such as 65 through simple interdigitated polar teeth such as 57 and 59. In some instances, former machines such as shown in Fig. 5 had the current flowing in the same clock direction in the coils 53 and 55, in which case the fields G and H bucked one another between the coils, and caused a single loop around both coils. This resulted in only two crossings of the toroidal flux field across the magnetic gap shown at 67. When the current flow was arranged to provide the four crossings such as shown in Fig. 5, the inductor drum 65 could in fact be separated at a point such as 69 without much change in operation, thus illustrating that the compound construction shown simply operated as the sum of two older single-coil types of machines.

Figure 2:
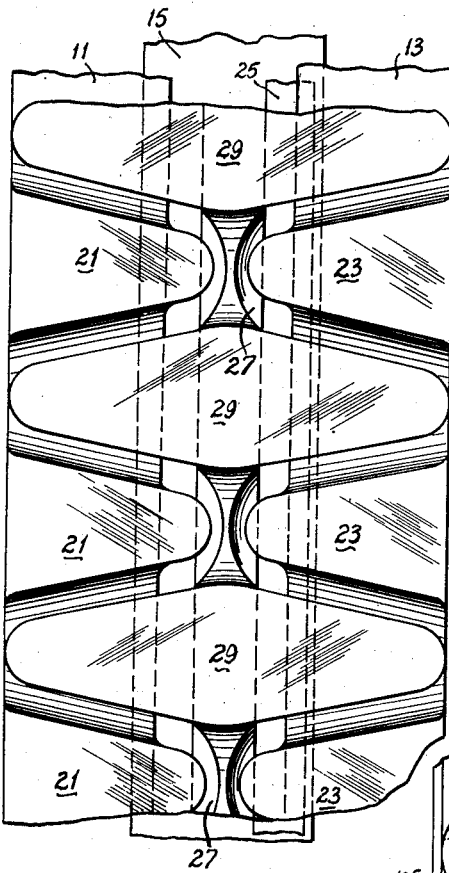
Fig. 2 is a developed view showing certain pole faces, being viewed on line 2—2 of Fig. 1.

Referring to Figs. 1 and 2, the present construction operates differently. Due to the isolation of the bridging poles 29 from the poles 21 and 23 and the four traverses of the gaps 49 and 51 by a single toroidal flux field F from a single coil 15, there results a smaller and lighter-weight machine for the same capacity as compared to the machine illustrated in Fig. 5. While the coil 15 needs to be somewhat larger than either the coils 53 or 55 in Fig. 5, it is not required that it be twice as large. Moreover, all of the iron required to carry flux between the coils 53 and 55 in Fig. 5 is eliminated in the Fig. 1 construction.

Another important improved result is that magnetic leakage between poles is considerably reduced. Cross leakage between groups of poles such as 57 and 59 or 61 and 63 in Fig. 5 tends to occur in parallel leakage paths, which considerably reduces the reluctance against leakage. Therefore, more iron needs to be provided in the poles themselves to inhibit leakage in a construction such as shown in Fig. 5. In the case of the construction shown in Fig. 1, any cross leakage between poles such as shown at 23 with respect to the bridging poles 29 must be in series with the corresponding leakage between the bridging poles 29 and the group of poles 21. The resulting serial leakage paths provide a greater reluctance against leakage. Thus iron weight in the poles themselves is conserved in a machine such as in Fig. 1.

While in a construction such as shown in Fig. 1 separated inductor sleeves such as shown at 41 and 45 are highly desirable, a substantial amount of improvement is retained, even though these are magnetically joined or integrated such as at point 71. This is particularly true in the case of machines having high slipping speeds, for then the reactance built up between the eddy currents generated in the inductor drum or sleeve and the flux developed at the pole tips tend to deflect the flux field through the bridging poles 29. The isolation of the magnetic bridging poles 29 from magnetic contact with the magnetic material of the poles 21 and 23 is important. In the case of Fig. 5, the inner poles 59 and 63 are not so isolated.

Figure 3:
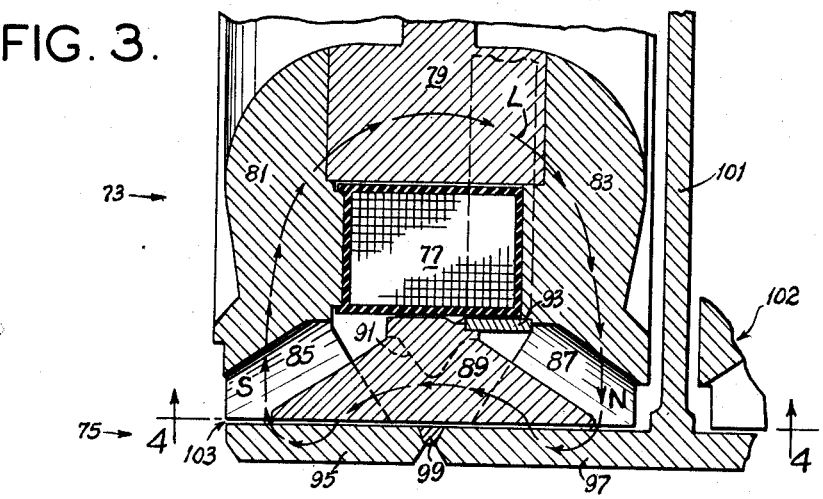
Fig. 3 is a fragmentary axial section showing an alternative form of the machine.
Figure 4:
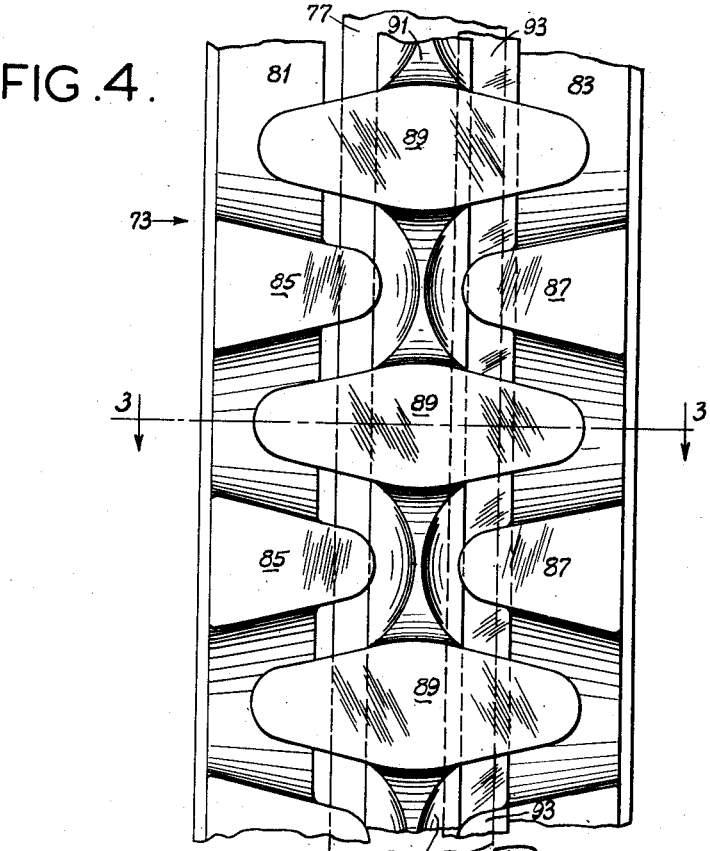
Fig. 4 is a developed view showing certain of the pole faces of the Fig. 3 form of the invention, being viewed on line 4—4 of Fig. 3.

In Figs. 3 and 4 is shown an alternative form of the invention in which the inner and outer relationship between the inductor and field members is reversed, and in which the field member may be the driving member and the inductor sleeve the driven one. The field member is shown at numeral 73 and the inductor at 75. The field member is composed of an annular coil 77. This is enveloped by an inside ring 79 and flanking rings 81 and 83 having claw-type poles 85 and 87, respectively. All of these are magnetic (iron). The isolated magnetic bridging poles are indexed at 89, being carried upon a ring 91. A nonmagnetic mounting ring is shown at numeral 93, being welded both to the ring 91 and ring 83. The inductor 75 is composed of two magnetic drums or sleeves 95 and 97, welded together at 99 by a nonmagnetic substance, for example, brass. As is indicated at the right inside of Fig. 3, the ring 97 is mounted upon a radial member 101. The center line of rotation is above Fig. 3. The structure may be compounded by extending the magnetic ring 97 to the right and duplicating the parts as fragmentarily suggested at 102. Further details in regard to this type of compounding are unnecessary, since they are well known in the art.

The toroidal flux field associated with the Fig. 3 structure is shown at letter L. The flux circuit is through rings 79, 83, north poles 87, drum 97, bridging pole 89, ring 95, south poles 85, ring 81 and back to ring 79. Again there are four traverses of this flux field across the magnetic gap 103. The Fig. 3 type of construction is desirable for certain applications wherein it is desirable to expose the inductor drum for better air- or liquid-cooling purposes.

From the above it will be seen that features of the invention consist in an annular field coil nested in a toroidal shell (9, 11, 13, Fig. 1; or 79, 81, 83, Fig. 3) composed of a magnetic material such as iron. This toroidal shell carries claw-type teeth (21, 23, Fig. 1; or 85, 87, Fig. 3). Between the claw-type teeth are bridging magnetic (iron) poles (29 in Fig. 1; 89 in Fig. 3). In each case the mounting for the bridging poles is such as to isolate them from any direct magnetic contact with either the magnetic shell or the magnetic claw teeth, although these bridging poles are in the magnetic circuit F or L. The faces of all poles are on one side of a magnetic gap and on the other side of this gap is an inductor drum which preferably is made in two magnetic rings (41, 45, in Fig. 1; or 95, 97 in Fig. 3) having a high-reluctance gap between them (air gap 71, Fig. 1; or the gap formed by the brass ring 99, Fig. 3). It is to be understood, however, that the gap 71 or ring 99 may be eliminated and the adjacent drums placed in magnetic contact or made integral. The latter construction, however, is not preferred except for high slipping speeds.

Figure 6:
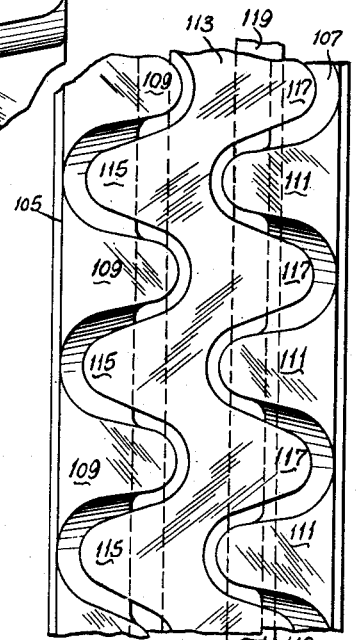

The invention is not limited to the coaxial arrangement of the claw-type of teeth. This point is illustrated in Fig. 6, wherein the flanking rings are indicated at 105 and 107, with staggered claw-type teeth 109 and 111, respectively. The magnetic ring for supporting the bridging poles is shown at 113 and the bridging poles themselves are indicated at 115 and 117, respectively, these being also staggered. A nonmagnetic mounting ring is shown at 119 on Fig. 6.

While the invention is an improvement when used on eddy-current machines having any usable pole shapes, it is particularly effective in the case of machines having pole shapes made according to the principles outlined in said Patent 2,470,596, this principle being that the pole cross section, normal to the mean flux path through the pole, shall carry a constant flux density, preferably at or near saturation.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electromagnetic coupling comprising driving and driven members, an annular field coil adapted to produce a toroidal flux field, first and second pole rings attached to one of said members which in an axial direction are oppositely disposed with respect to the plane of said coil and are located in said toroidal flux field, the other member comprising an inductor composed of at least one sleeve having cylindric magnetic portions respectively facing each of said pole rings across an invariable distance between them, a third magnetic pole ring located between said first and second pole rings and facing said inductor across an invariable distance, and nonmagnetic means for mounting said third ring between said first and second rings and out of direct magnetic contact therewith.

2. An electromagnetic coupling comprising driving and driven members, an annular field coil supported on one of said members adapted to produce a toroidal flux field, first and second rings of poles attached to said member which carries the field coil, the planes of which rings of poles in an axial direction are oppositely disposed with respect to the plane of said coil and are located in said toroidal flux field, the other member comprising an inductor composed of at least one sleeve having cylindric magnetic portions respectively facing each of said rings across an invariable distance, a third ring of magnetic poles on the field coil supporting member and located between said first and second rings of poles and facing said inductor across an invariable distance, and nonmagnetic means for mounting said third ring between said first and second rings and out of direct magnetic contact therewith.

3. An electromagnetic coupling comprising driving and driven members, an annular field coil carried upon one of the members, a toroidal magnetic shell nesting the field coil, axially spaced rings of poles extending from said shell and flanking said coil, the other member comprising a magnetic inductor composed of at least one inductor sleeve having portions facing each of said flanking ring of poles at an invariable distance, a third ring of magnetic poles located between said flanking poles and facing said inductor sleeve at an invariable distance, and nonmagnetic means for mounting said third ring of poles out of direct magnetic contact with any of said flanking rings of poles but rotatable therewith.

4. Apparatus made according to claim 3, in which poles of said third ring interdigitate poles of both of said flanking rings.

5. Apparatus made according to claim 4, wherein the poles of the flanking rings are in axial alignment relative to one another.

6. Apparatus made according to claim 4, wherein the poles of the flanking rings are peripherally staggered relatively to one another, and wherein the oppositely interdigitating portions of the poles of the third ring also are peripherally staggered.

RALPH L. JAESCHKE.

References Cited in the file of this patent

UNITED STATES PATENTS

| Number | Name | Date |
|---|---|---|
| 2,108,662 | Fisher | Feb. 15, 1938 |

FOREIGN PATENTS

| Number | Country | Date |
|---|---|---|
| 549,552 | Great Britain | Nov. 26, 1942 |